(12) United States Patent
Iino et al.

(10) Patent No.: US 6,586,860 B1
(45) Date of Patent: Jul. 1, 2003

(54) ULTRASONIC MOTOR AND ELECTRONIC DEVICE WITH ULTRASONIC MOTOR

(75) Inventors: Akihiro Iino, Chiba (JP); Kenji Suzuki, Chiba (JP); Masao Kasuga, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/696,790

(22) Filed: Oct. 26, 2000

(51) Int. Cl.$^7$ ............................................. H01L 41/08
(52) U.S. Cl. ............ 310/316.02; 310/317; 310/316.01; 310/323.02; 310/323.06
(58) Field of Search .................. 310/316.01, 316.02, 310/316.03, 317

(56) References Cited

U.S. PATENT DOCUMENTS

| | | | | |
|---|---|---|---|---|
| 4,833,358 A | * | 5/1989 | Suzuki et al. | 310/316.02 |
| 5,247,220 A | * | 9/1993 | Miyazawa et al. | 310/316.02 |
| 5,343,108 A | * | 8/1994 | Miyazawa et al. | 310/317 X |
| 5,777,444 A | * | 7/1998 | Motegi | 318/114 |
| 5,780,955 A | * | 7/1998 | Iino et al. | 310/316.02 |
| 6,144,140 A | * | 11/2000 | Iino et al. | 310/316.02 |

FOREIGN PATENT DOCUMENTS

| | | |
|---|---|---|
| EP | 0991176 | 4/2000 |
| JP | 63-268477 | 11/1988 |
| JP | 4-322180 | 11/1992 |
| JP | 5-276769 | 10/1993 |
| WO | 99/039429 | 8/1999 |

* cited by examiner

Primary Examiner—Mark O. Budd
(74) Attorney, Agent, or Firm—Adams & Wilks

(57) ABSTRACT

In a self-excited oscillator circuit, a buffer is connected to an electrode or electrodes, and a buffer and an inverter are connected to an electrode or electrodes. Each of the inverters and and the buffer has a tri-state configuration and is capable of setting an output terminal in a high-impedance state, i.e., turning off an output signal, according to a signal input to a control terminal. Therefore, it is possible to turn off a drive circuit and the ultrasonic motor by setting the inverter in the high-impedance state. It is also possible to change the direction of movement of the moving member by setting one of the buffer and the inverter in the high-impedance state.

24 Claims, 8 Drawing Sheets

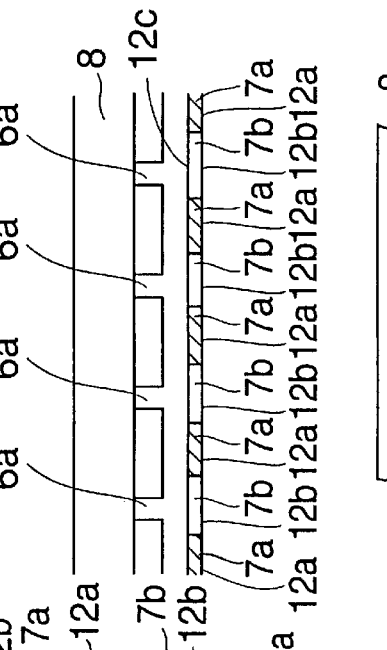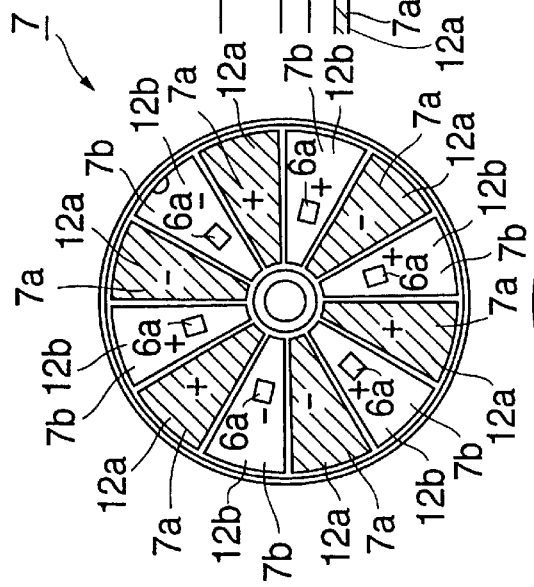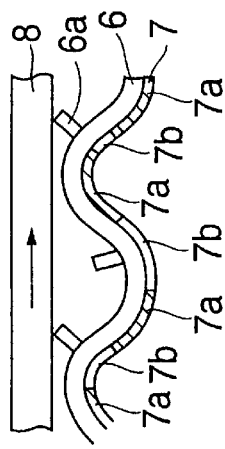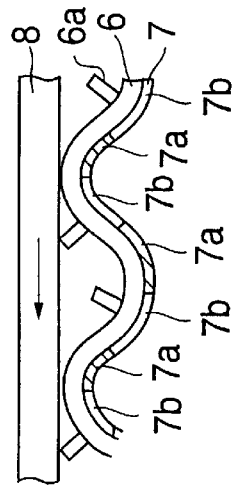

ULTRASONIC MOTOR AND ELECTRONIC DEVICE WITH ULTRASONIC MOTOR

BACKGROUND OF THE INVENTION

1. Field of the Invention

The present invention relates to an ultrasonic motor which frictionally drives a moving member with vibrating member having a piezoelectric element, and to an electronic device using the ultrasonic motor. More particularly, the present invention relates to an ultrasonic motor used as a vibrating element to perform self-excited-oscillation driving.

2. Description of the Prior Art

Recently, ultrasonic motors as actuators based on a new principle and used in various electric devices have attracted attention and their applications in various fields, e.g., those to automatic focusing drives for cameras have been examined and developed. As drive systems for ultrasonic motors, separate excitation drive systems have generally been used in which a vibrating member having a piezoelectric element is excited in a predetermined vibration mode. Recently, since separate excitation drive systems have a complicated circuit configuration, self-excitation drive systems in which an ultrasonic motor is used as a vibrating element to cause oscillation at a resonance point of the vibrating element have been used generally on a trial basis instead of separate excitation drive systems, and practical self-excitation drive systems are now being developed. If a circuit according to such a system is used, the circuit can be formed so as to be simpler and smaller. This means that electronic devices incorporating drive circuits can be designed so as to be smaller in size and lower in price. Self-excited-oscillation drives for ultrasonic motors, e.g., one disclosed in Japanese Patent Examined Publication No. Hei 8-107686 have been proposed.

If a self-excited oscillator circuit such as described above is used to drive an ultrasonic motor, a function of changing the direction of movement of a moving member is achieved in such a manner that a drive signal is selectively applied to electrodes of a piezoelectric element to change the positional phase of a vibrational wave caused in the moving member. In such a case, however, there has been a problem in that the actually operating portion of the piezoelectric element used for driving is reduced, so that a sufficiently large output cannot be obtained.

It is, therefore, an object of the present invention to provide a self-excited oscillator circuit capable of changing the direction of movement of a moving member with respect to ultrasonic motors designed such that the entire of a piezoelectric element provided on a vibrating member is utilized to obtain a large output while the size of the motor is limited.

SUMMARY OF THE INVENTION

According to the present invention, self-excited-oscillation drive is realized with respect to a ultrasonic motor capable of changing the direction of movement of a moving member by using at least two groups of electrodes and by applying drive signals in phase with each other or in phase opposition to each other to the two electrode groups.

The present invention is characterized in that a common electrode is provided on one surface of a piezoelectric element; a plurality of drive electrodes are provided on the other surface of the piezoelectric element; the plurality of drive electrodes are connected to each other at one connection point by a connection means; and inverting means is provided between the connection point and at least one of the drive electrodes to invert the phase of a drive signal according to a command signal supplied from the outside, thereby enabling the direction of movement of a moving member to be changed. In this manner, self-excited-oscillation drive for the ultrasonic motor can be realized which enables the direction of movement of the moving member to be controlled by utilizing the entire of the piezoelectric element for drive.

The present invention is also characterized in that, in the above-described ultrasonic motor, an LC resonant circuit formed of the vibrating member and a capacitive element is utilized and the inverting means is provided between the vibrating member and the capacitive element. According to the present invention, a Colpitts oscillator circuit widely used in combination with quartz crystal is utilized to enable normal/reverse direction to be controlled in driving using the entire of a piezoelectric element.

The present invention is further characterized in that, in the above-described ultrasonic motor, a detection electrode is provided on another surface of the piezoelectric element separately from the plurality of drive electrodes, and a self-excited oscillator circuit is formed in such a manner that a detection signal obtained from the detection electrode is amplified by an amplifier circuit and output to the drive electrodes. According to the present invention, a vibration feedback type self-excited oscillator circuit is utilized to enable normal/reverse direction to be controlled in driving using the entire of a piezoelectric element.

The present invention is further characterized in that, in the above-described ultrasonic motor, the inverting means is formed by the amplifier circuit, and the level of the drive signal is constant irrespective of whether or not the phase of the drive signal is inverted. Therefore, it is possible to supply a large drive signal to the piezoelectric element while avoiding a loss in the drive signal in the inverting means, and to perform stable large-output drive. The moving member output is constant irrespective of the direction of movement of the moving member.

The present invention is further characterized in that a drive signal adjustment circuit is provided to adjust the drive signal so that the drive signal supplied to the drive electrode not connected to the inverting means, and the drive signal supplied to the drive electrode connected to the inverting means are substantially equal in level. The drive signals supplied to the two electrodes are thus equalized, so that the vibration caused in the vibrating member is balanced to achieve stable large-output drive.

Further, according to the present invention, an electronic device having the above-described ultrasonic motor can be obtained, and designs for smaller electronic devices become possible.

BRIEF DESCRIPTION OF THE DRAWINGS

A preferred form of the present invention is illustrated in the accompanying drawings in which:

FIGS. 3A–3D show the principle of working of the ultrasonic motor of the present invention;

DETAILED DESCRIPTION OF THE PREFERRED EMBODIMENTS

Modes of embodiment of the present invention in an applied state will be described with reference to FIGS. 1 through 9.

Embodiment 1

An example of an ultrasonic motor designable in accordance with the present invention will be described.

Figure 1A:
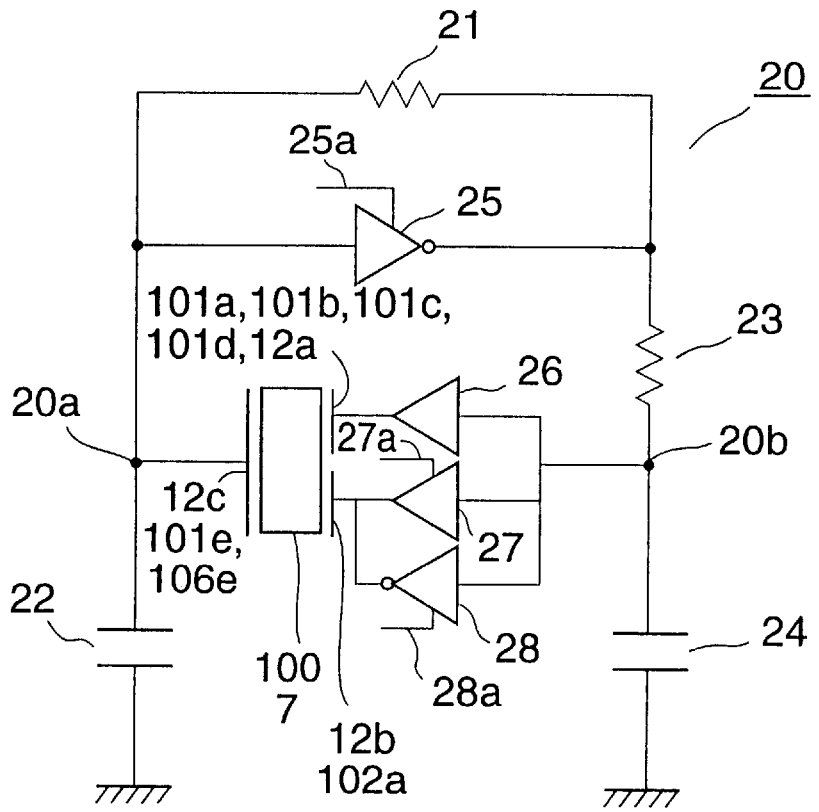
FIGS. 1A and 1B show an example of an ultrasonic motor drive circuit of the present invention.
Figure 1B:
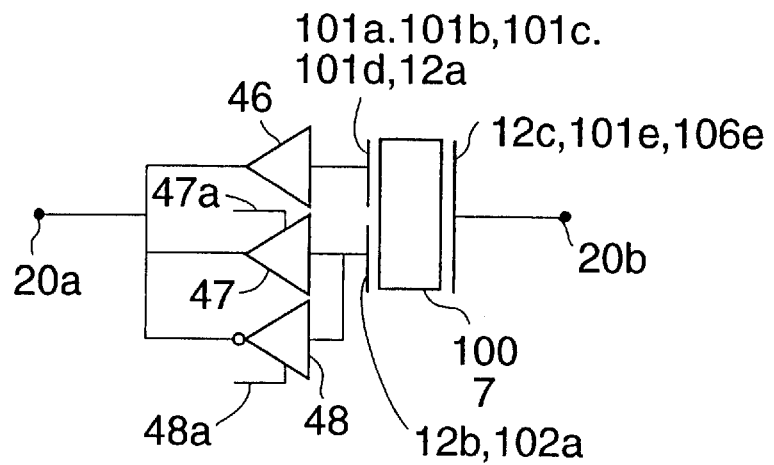

FIGS. 1A and 1B show a self-excited oscillator circuit of the present invention in Embodiment 1.

Figure 2:
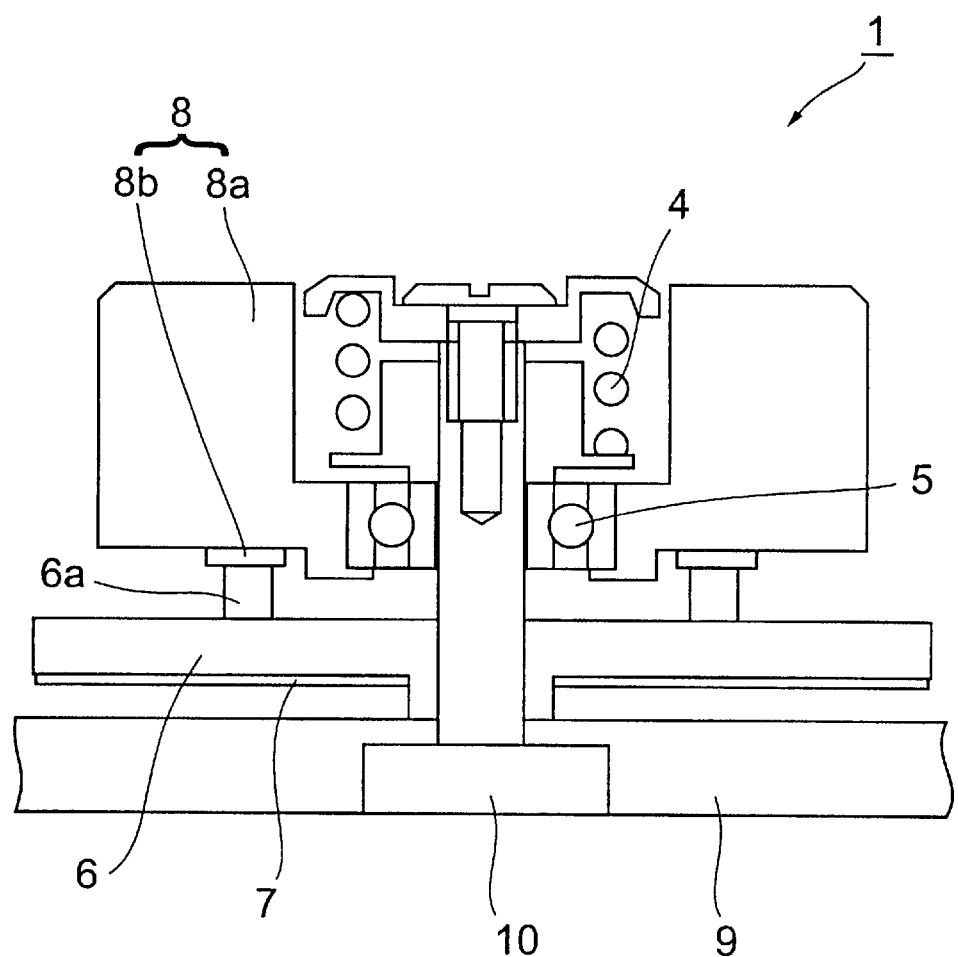
FIG. 2 is a cross-sectional view of the structure of the ultrasonic motor of the present invention.

FIG. 2 shows the structure of an ultrasonic motor 1 designable in accordance with the present invention, and FIGS. 3A through 3D show the principle of working of the ultrasonic motor 1. First, the principle of working of the ultrasonic motor in accordance with the present invention will be described. Referring to FIG. 2, a disklike vibrating member 6 is supported at its center by a center shaft 10 fixed on a supporting plate 9. A piezoelectric element 7 is joined to a first surface of the vibrating member 6, and projections 6a for enlarging vibrating displacements of the vibrating member to produce a force for rotating a moving member 8 are provided on a second surface of the vibrating member 6. A bearing 5 is provided at a center of the moving member 8, and has its central portion guided by the center shaft 10. A spring member 4 pressures the inner ring of the bearing 5 to cause a pressure for contact between the projections 6a of the vibrating member 6 and the frictional member 8a of the moving member 8. Vibrational waves excited in the vibrating member 6 by the piezoelectric effect of the piezoelectric element 7 are converted into a torque of the moving member 8 through a frictional force.

The principle of working will be described in detail with reference to FIG. 3. In the piezoelectric element 7 joined to the vibrating member 6, sectoral regions are defined by radial lines spaced apart by ¼ wavelength in the circumferential direction, and are polarized in the direction of thickness in such a manner that the direction of polarization is alternately reversed with respect to every other sector. Two groups of electrode patterns corresponding to hatched areas 12a and non-hatched areas 12b are formed by electrical short-circuiting the respective electrode patterns at every other sector. The vibrating member 6 and the piezoelectric element 7 are joined to each other so that each of the projections 6a of the vibrating member 6 is located at a center of one segmental electrode which is one of a hatched area 12a electrode pattern and non-hatched area 12b electrode pattern. An electrode 12c is formed so as to cover the entire joint surface.

When drive signals having a predetermined frequency and in phase with each other are applied to the hatched-area pattern group 12a and the non-hatched-area pattern group 12b, a standing wave such as shown in FIG. 3C is caused in the vibrating member 6. At the point of this time, the projections 6a moved upward are inclined to the right, so that the moving member 8 in contact with the projections 6a moves to the right.

Next, when drive signals having different phases of 180° therebetween are applied to the hatched-area pattern group 12a and the non-hatched-area pattern group 12b, a standing wave such as shown in FIG. 3D is caused in the vibrating member 6, and the moving member 8 then moves to the left. As described above, the common electrode 12c is provided on one surface of the piezoelectric element, two electrode groups 12a and 12b are provided on the other surface, and drive signals in phase with each other or in phase opposite to each other are applied to the two electrode groups 12a and 12b to shift the position of the standing wave caused in the vibrating member, thereby being capable of control of the direction in which the moving member in contact with the vibrating member moves.

If the piezoelectric element 7 of this embodiment is used, a standing wave can be excited such that the total number of waves in the circumferential direction is three.

Further, since the number of nodes in a radial direction varies with respect to frequencies, it is preferred that each projection 6a is provided at the maximum-amplitude point of the excited vibration mode in the radial direction.

Figure 4:
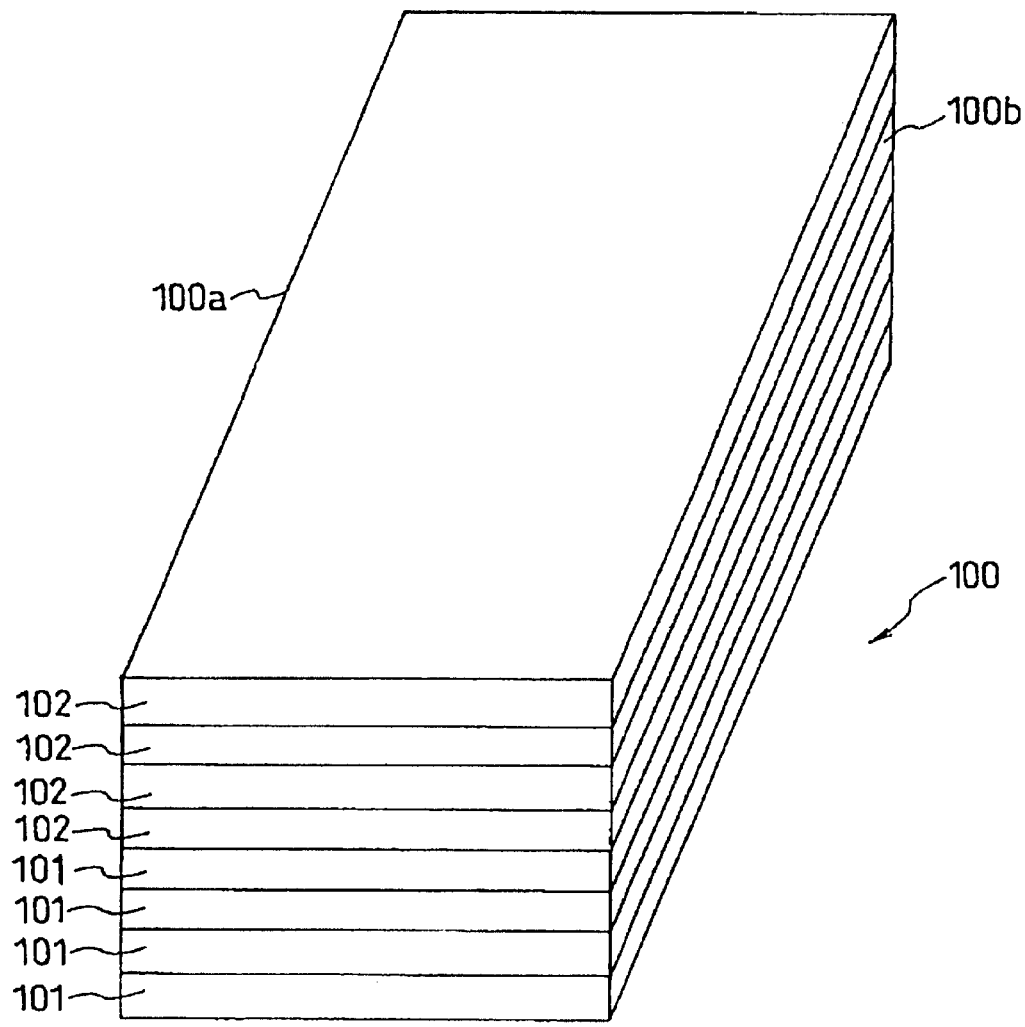
FIG. 4 shows an example of the structure of the ultrasonic motor of the present invention.
Figure 5A:
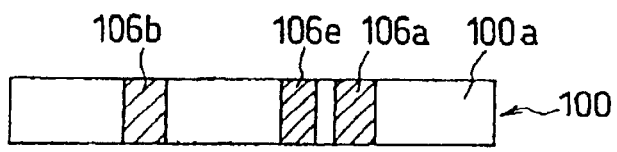
FIGS. 5A–5F show electrode patterns of piezoelectric elements in another example of the structure of the ultrasonic motor of the present invention.
Figure 5B:
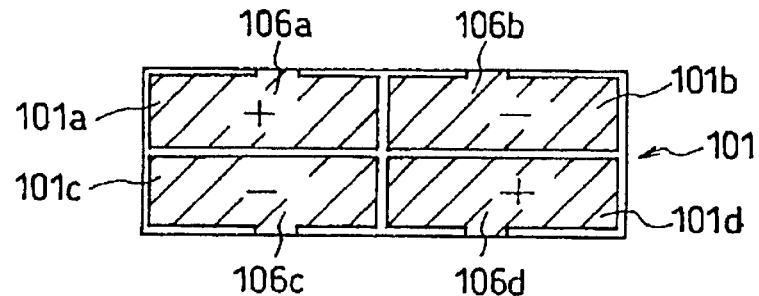
Figure 5C:
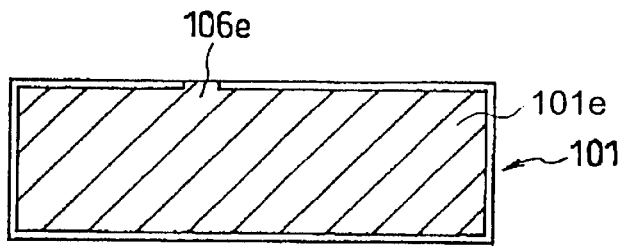

FIG. 4 shows the structure of another example of an ultrasonic motor designable in accordance with the present invention. A rectangular vibrating member 100 is constructed in such a manner that a plurality of piezoelectric elements 101, 101, 101, 102, 102, 102 each formed as a plate with an electrode formed on its upper surface are integrally sintered. FIGS. 5A to 5F show details of this structure. There are two types of plate piezoelectric elements 101: one having its upper surface divided into four electrodes 101a, 101b, 101c, and 101d, as shown in FIG. 5B, and one having its upper surface formed substantially entirely by an electrode 101e, as shown in FIG. 5C. When these types of elements are alternately stacked, joints therebetween are common electrodes.

Figure 5D:
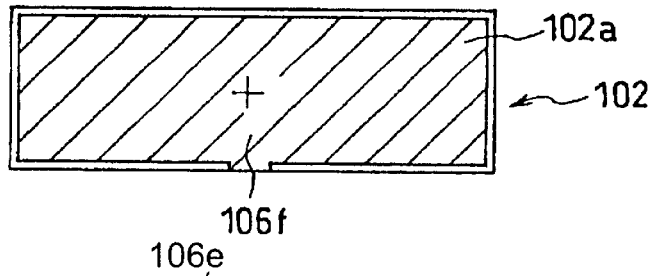
Figure 5E:
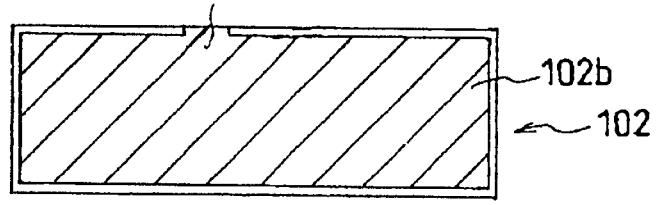
Figure 5F:
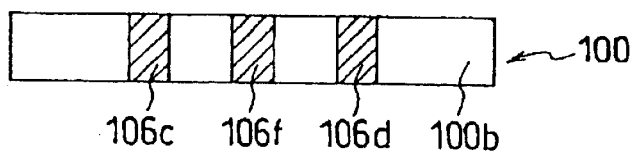

There are two types of plate piezoelectric elements 102: one having its upper surface formed substantially entirely by an electrode 102a, as shown in FIG. 5D, and one having its upper surface formed substantially entirely by an electrode 102b, as shown in FIG. 5E. When these types of elements are alternately stacked, joints therebetween are common electrodes. Needless to say, the joint between the plate piezoelectric element 101 and the piezoelectric element 102 is also a common electrode.

The electrodes include lead electrodes 106a, 106b, 106c, 106d, 106e, and 106f each lead to a side surface 100a or 100b of the vibrating member 100. After sintering of the entire vibrating member 100, the electrodes are electrically connected by being short-circuited at the side surface 100a or 100b. Consequently, the electrodes 101e and 102b are common electrodes of the plate piezoelectric elements 101 and 102.

After the completion of sintering of the vibrating member and short-circuiting of the electrodes thus performed, a high voltage with respect to the electrodes 101e and 102b is applied to the other electrodes to perform polarization in the directions according to + and − shown in the figures. The electrodes 101e and 102b are short-circuited by the lead electrode 106e.

Figure 6:
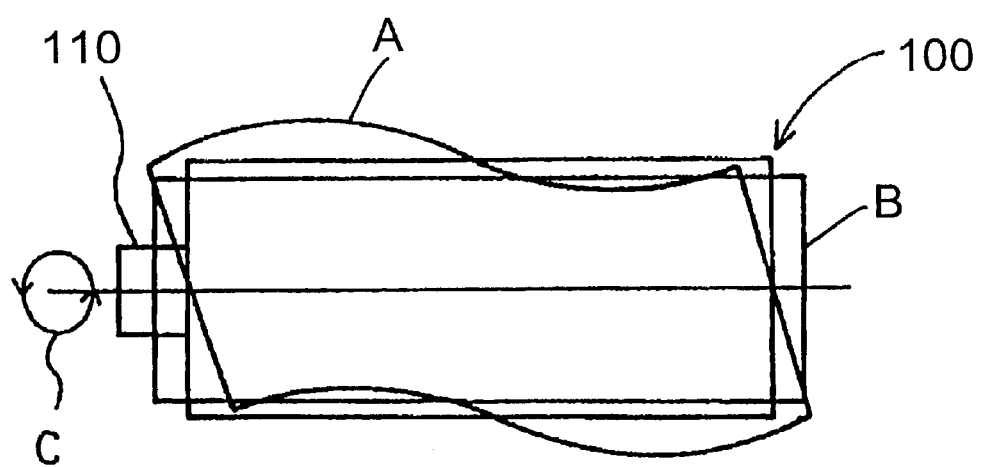
FIG. 6 shows another example of the principle of working of the ultrasonic motor of the present invention.

In the plate piezoelectric elements 101, the electrodes 106a, 106b, 106c, and 106d are combined into one electrode group by being short-circuited and a signal is applied thereto with respect to the electrode 106e, thereby causing bending vibration A, as shown in FIG. 6. In the plate piezoelectric elements 102, a signal in phase with the signal applied to the electrodes 106a, 106b, 106c, and 106d is applied to the electrode 106f with respect to the electrode 106e, thereby causing extending vibration B. Vibration C, which is a resultant of the above described two vibrations, is caused in the vibrating member 100 to drive a moving member in contact with a side surface of the vibrating member 100. For example, by providing a projection 110 on a portion of the side surface of the vibrating member 100, an output can be obtained efficiently.

By applying signals having opposite phases to the group of electrodes 106a, 106b, 106c, and 106d, and the electrode 106f, the direction of the resultant displacement of the two vibrations can be reversed, thereby making it possible to reverse the direction of movement of the moving member.

Referring back to FIG. 1, a self-excited oscillator circuit in Embodiment 1 of the present invention will now be described. Referring to FIG. 1A, a self-excited oscillator circuit 20 has a piezoelectric element 7 or 100 forming a portion or the entire of a vibrating member, capacitors 22 and 24, resistors 21 and 23, inverters 25 and 28, and buffers 26 and 27.

The circuit shown in FIG. 1A is an ultrasonic motor drive circuit using a Colpitts type self-excited oscillator circuit. The Colpitts oscillator circuit is an oscillator circuit devised on the basis of a phenomenon in which the piezoelectric element 7 or 100 becomes inductive between a resonance point and an antiresonance point. The piezoelectric element 7 or 100 and two capacitors 22, and 24 form an LC resonant circuit. An inverting amplifier circuit formed by the inverter 25 and the feedback resistor 21 performs inverting amplification of a signal from the resonant circuit, and returns the signal to the resonant circuit to maintain oscillation. The resistor 23 and the capacitor 24 form a low-pass filter to block high-order spurious mode signals from the vibrating member.

The buffer 26 is connected to an electrode 12a or electrodes 101a, 101b, 101c, and 101d, and the buffer 27 and the inverter 28 are connected to an electrode 12b or electrodes 102a. Input terminals of the buffers 26 and 27 and the inverter 28 are combined into one at a connection point 20b. Each of the inverters 25 and 28 and the buffer 27 has a tri-state configuration, and can have one of two states: an active state and a non-active state (high-impedance state) according to a signal input to a control terminal 25a, 27a, or 28a. For example, when a high-level command signal is input to the control terminals 25a, 27a, and 28a, the inverters 25 and 28 and the buffer 27 are set in the active state, i.e., the ON state. When a low-level command signal is input, they are set in the non-active state, i.e., the OFF state.

Therefore, it is possible to turn off the drive circuit and the ultrasonic motor by setting the inverter 25 in the high-impedance state. It is also possible to change the direction of movement of the moving member by setting one of the buffer 27 and the inverter 28 in the high-impedance state. For example, if the buffer 27 is in the ON state while the inverter 28 is in the OFF state, in-phase drive signals are applied to the electrode 12a or electrodes 101a, 101b, 101c, and 101d, and the electrode 12b or electrodes 102a. On the other hand, if the buffer 27 is in the OFF state while the inverter 28 is in the ON state, signals having opposite phases are applied to the electrode 12a or electrodes 101a, 101b, 101c, and 101d, and the electrode 12b or electrodes 102a.

The buffer 26 is not always necessary. However, the buffer 26 operates as an amplification circuit like the inverter 28 and the buffer 27, and has output characteristics equivalent to those of the inverter 28 and the buffer 27. Therefore, signals substantially equal in level can be applied to the electrode 12a or electrodes 101a, 101b, 101c, and 101d, and the electrode 12b or electrodes 102a. Also, the phase inverting means formed by the inverter 28 and the buffer 27, which also function as amplifiers, has an effect of avoiding a reduction in the level of the signal supplied to the electrode 12b or electrodes 102a. Further, the phase inverting means are arranged as a system selectively operating the inverter 28 and the buffer 27 having substantially the same output characteristics, so that the output through the moving member 8 is constant irrespective of the direction of movement of the moving member 8.

The arrangement may alternatively be such that the buffer 27 and the inverter 28 are connected to the electrode 12a, or electrodes 101a, 101b, 101c, and 101d while the buffer 26 is connected to the electrode 12b or electrodes 102a.

FIG. 1B shows an example of modification of the arrangement shown in FIG. 1A. The configuration of the self-excited oscillator circuit 20 is changed between 20a and 20b. In this arrangement, whether an output signal from the electrode 12b or electrodes 102a is passed through a buffer 47 or through an inverter 48 is determined according to a control signal supplied from the outside, thereby determining whether a signal in phase with the output signal is returned or a signal in opposite phase is returned, to the self-excited oscillator circuit 20, is determined. If the opposite-phase signal is returned, the resulting state is equivalent to the state where drive signal having opposite phase is applied to the electrode 12a or electrodes 101a, 101b, 101c, and 101d, and the electrode 12b or electrodes 102a, so that the direction of movement of the moving member 8 is reversed.

Embodiment 2

Figure 7:
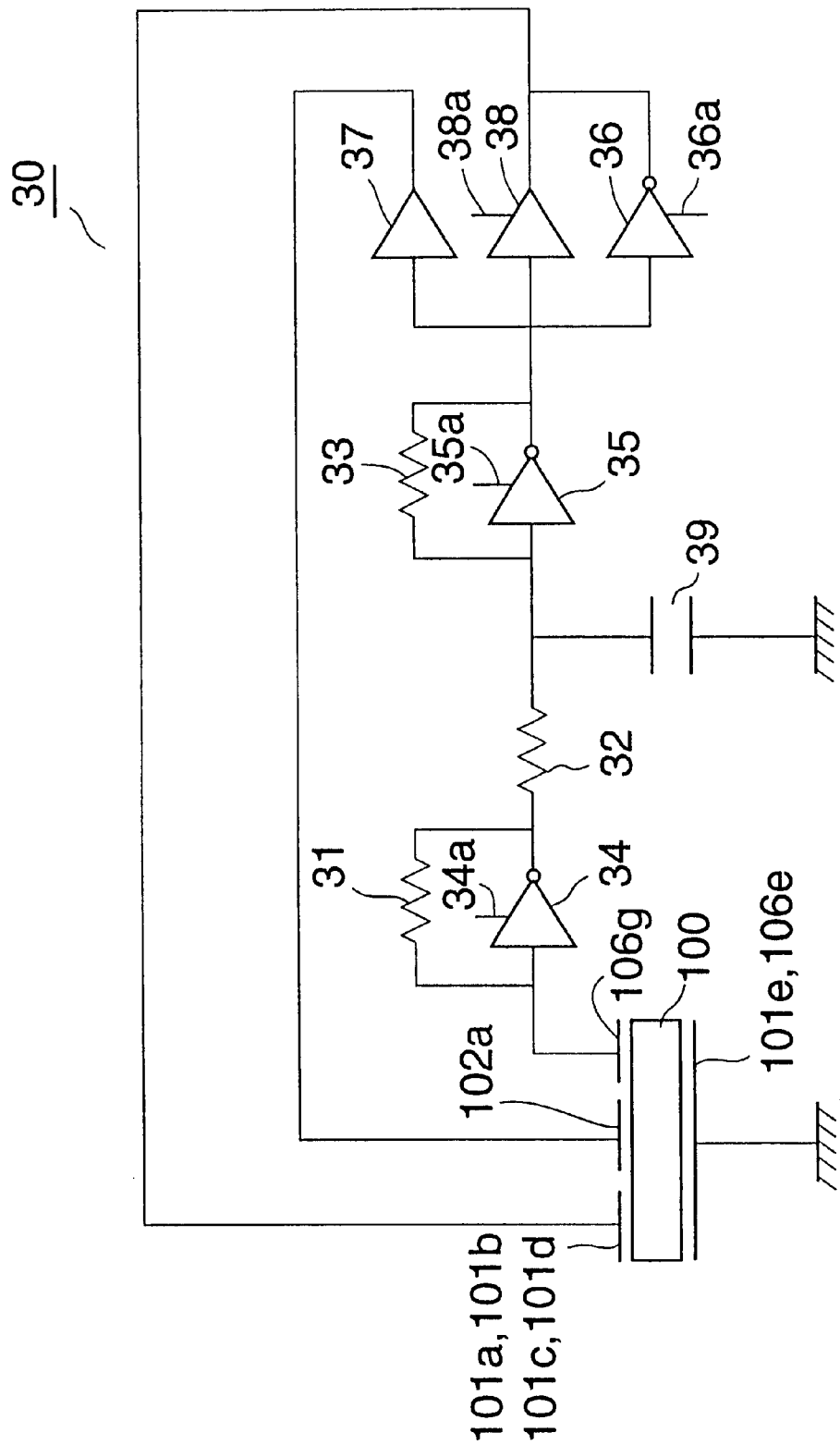
FIG. 7 shows another example of the ultrasonic motor drive circuit of the present invention.

FIG. 7 shows a self-excited oscillator circuit of the present invention in Embodiment 2.

Figure 8A:
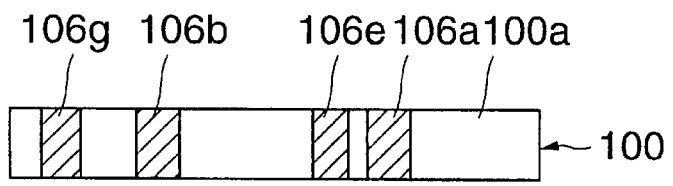
FIGS. 8A and 8B show another example of electrode patterns of piezoelectric elements of the ultrasonic motor of the present invention.
Figure 8B:
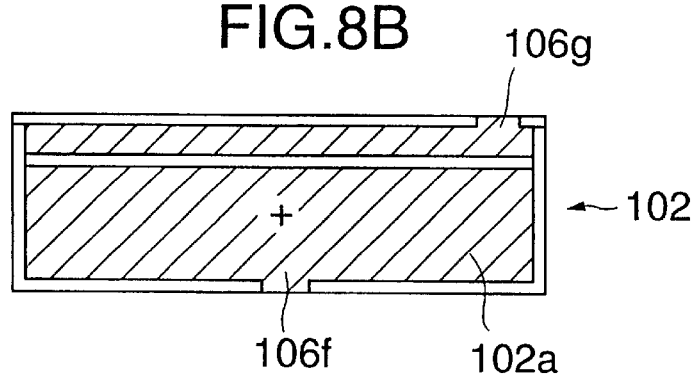

FIGS. 8A and 8B show the structure of an ultrasonic motor in implementation of the present invention. Basically, a vibrating member 100 in this Embodiment is the same as the vibrating member 100 shown in FIG. 4 except that the electrodes of the plate piezoelectric element 102 shown in FIG. 5D are replaced with electrodes shown in FIG. 8B. An electrode 106g is formed separately from each electrode 102a to detect a state of vibration of the vibrating member 100. Electrodes g are also short-circuited at the side surface 100a.

The vibrating member 100 formed of piezoelectric elements has the vibration state detection electrodes 106g, and the drive electrodes 101a, 101b, 101c, 101d, and 102a. A signal detected through the detection electrodes 106g is amplified by an amplifier circuit and supplied to the drive electrodes 101a, 101b, 101c, 101d, and 102a to sustain vibration. A vibration feedback type self-excited oscillator circuit 30 is formed.

Referring to FIG. 7, a signal detected through the detection electrodes 106g is amplified by an amplifier circuit formed by tri-state inverters 34 and 35 and feedback resistors 31 and 33. A low-pass filter formed by a resistor 32 and a capacitor 39 blocks high-order spurious mode signals from the vibrating member, and adjusts the phase of the detected signal to adjust the oscillation frequency.

The configurations of the amplifier circuit and the filter circuit are not limited to those shown with respect to this embodiment. A buffer 37 is connected to the electrodes 102*a*, and a tri-state buffer 38 and a tri-state inverter 36 are connected to the electrodes 101*a*, 101*b*, 101*c*, and 101*d*. A signal applied to the electrodes 101*a*, 101*b*, 101*c*, 101*d*, and a signal applied to the electrodes 102*a* can be changed between the in-phase state and the opposite phase state by selectively setting one of the buffer 38 and the inverter 36 in a high-impedance state, as in Embodiment 1. Therefore, the direction of movement of the moving member can be changed.

It is possible to turn off the drive circuit and driving of the ultrasonic motor 1 by setting the inverters 34 and 35 in the high-impedance state.

The arrangement may alternatively be such that the buffer 38 and the inverter 36 are connected to the electrodes 102 while the buffer 37 is connected to the electrodes 101*a*, 101*b*, 101*c*, and 101*d*.

The vibration state detection electrodes 106*g* are provided on the plate piezoelectric elements 102 in the above-described embodiment. Alternatively, they may be provided on the plate piezoelectric elements 101 or may be provided on a piezoelectric element provided separately from the plate piezoelectric elements 101 and 102 and sintered integrally with the plate piezoelectric elements 101 and 102.

The structure of the ultrasonic motor is not limited to a particular type as long as a detection electrode is provided. The present invention can be implemented by providing a detection electrode in the piezoelectric element 7 of the ultrasonic motor 1.

Embodiment 3

Figure 9:
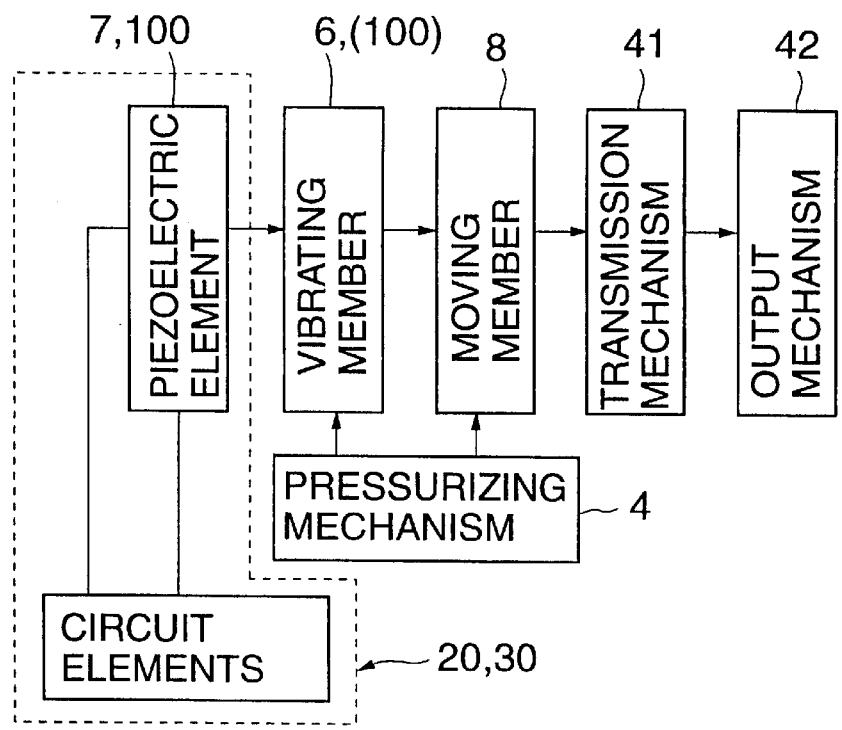
FIG. 9 shows an example of application of the ultrasonic motor in accordance with the present invention to an electronic device.

FIG. 9 is a block diagram of Embodiment 3 in which the ultrasonic motor in accordance with the present invention is applied to an electronic device.

The electronic device is characterized by having the above-described vibrating member 6, the moving member 8 driven by the vibrating member 6, pressuring means 4 for applying a pressure to the moving member 8 and the vibrating member 6 for contact between these members, a transmission mechanism 41 capable of moving by linking to the moving member 8, and an output mechanism 42 which moves based on the movement of the transmission mechanism 41.

In the transmission mechanism 41, for example, a transmission wheel, such as a toothed wheel or friction wheel, is used and formed directly on the moving member 8. The output mechanism may be directly provided without the transmission mechanism 41. Examples of output mechanism 42 are a pointer, a pointer drive mechanism, a display panel for displaying a calendar, etc., and a display panel drive mechanism in indicator devices and electronic watches; a mirror for changing the direction of laser in copying machines and printers; a shutter drive mechanism, an aperture drive mechanism, a lens drive mechanism, a film winding mechanism, and the like in cameras and video cameras; a slit plate or a filter for shielding or passing light, or passing light having a particular wavelength in measuring apparatus, manufacturing apparatus and sensors using laser or light; a contact mechanism or a gap plate for changing the resistance or capacitance value in a volume control or the like for audio apparatus; and a pickup drive mechanism in hard disks and optical disks.

If a motive power transmission mechanism is arranged in such a manner that an output shaft is attached to the moving member 8 and a torque is transmitted through the output shaft, the ultrasonic motor itself can form a drive mechanism. If the ultrasonic motor of the present invention is applied to an electronic device, the operating voltage, the power consumption, the size and the cost of the electronic device can be reduced. Naturally, since the ultrasonic motor is used, there is no influence of magnetism and no possibility of occurrence of detrimental magnetic noise.

According to the present invention, as described above, a self-excitation oscillation drive for a ultrasonic motor capable of changing the direction of movement of a moving member can be realized by providing at least two groups of electrodes and by applying drive signals in phase with each other or in phase opposite to each other to the two electrode groups. Thus, a self-excited oscillator circuit simple in configuration is used to drive an ultrasonic motor in which the entire piezoelectric element is used for driving, and to improve the facility with which the moving member drive direction is controlled.

Consequently, a low-voltage high-output ultrasonic motor can be realized, the drive circuit and the ultrasonic motor can be formed so as to be smaller, and electronic devices incorporating the ultrasonic motor and the drive circuit can be reduced in size and price.

What is claimed is:

1. An ultrasonic motor comprising:
   a piezoelectric element having a plurality of driving electrodes and a common electrode;
   a vibrating body driven by the piezoelectric element to undergo vibration in response to a signal applied across the driving electrodes and the common electrode of the piezoelectric element;
   a moving body driven by vibration of the vibrating body;
   a self-excited oscillating circuit having an amplifier circuit for amplifying an output signal of the piezoelectric element and feeding back the amplified output signal as a driving signal to the driving electrodes of the piezoelectric element to cause self-excited oscillation of the vibrating body;
   a common connecting point provided between the amplifier circuit and the plurality of driving electrodes of the piezoelectric element for connecting the plurality of driving electrodes to one point so that all of the driving electrodes are simultaneously driven; and
   an inverter provided between the common connecting point and at least one of the driving electrodes of the piezoelectric element for selectively inverting the phase of the driving signal supplied to the at least one driving electrode to control a direction of movement of the moving body.

2. An ultrasonic motor according to claim 1;
   wherein the self-excited oscillating circuit has an LC resonant circuit comprising the piezoelectric element and a capacitive element, and the inverter is provided between the piezoelectric element and the capacitive element.

3. An ultrasonic motor according to claim 1;
   wherein the piezoelectric element has the driving electrodes provided on a first surface and the common electrode provided on a second surface opposite,the first surface.

4. An ultrasonic motor according to claim 3;
   wherein the piezoelectric element has a disc shape.

5. An ultrasonic motor according to claim 1;
   wherein the piezoelectric element comprises a plurality of stacked piezoelectric elements, the common electrode comprises interconnected electrodes formed on a first surface of each of the stacked piezoelectric elements and the driving electrodes comprise interconnected electrodes formed on a second surface, opposite the first surface, of each of the stacked piezoelectric elements.

6. An ultrasonic motor according to claim 1;

wherein the piezoelectric element has a detection electrode provided on the first surface where the plurality of driving electrodes are provided, and the amplifier circuit amplifies a detection signal output from the detection electrode and outputs the amplified detection signal as a driving signals to the driving electrodes.

7. An ultrasonic motor according to claim 1;

wherein the amplified output signal supplied to the driving electrodes has a constant level whether or not the phase is inverted by the inverter.

8. An ultrasonic motor according to claim 1;

further comprising a driving signal adjusting circuit for adjusting the driving signal so that driving signals having substantially the same level are supplied to each of the driving electrodes whether or not the phase is inverted by the inverter.

9. An ultrasonic motor according to claim 1;

further comprising a spring member for resiliently urging the moving body into contact with the vibrating body.

10. An ultrasonic motor according to claim 1;

wherein the amplified output signal is supplied to all of the driving electrodes when the inverter is not selected so that a standing wave produced in the vibrating body causes the moving body to move in a first direction, and the amplified output signal is supplied to some of the driving electrodes while an output of the inverter is supplied to other driving electrodes when the inverter is selected so that a standing wave produced in the vibrating body causes the moving body to move in a second direction opposite the first direction.

11. An ultrasonic motor according to claim 1;

wherein the first surface of the piezoelectric element on which the driving electrodes are provided is divided into a plurality of sectors, adjacent pairs of the sectors being polarized in opposite directions, each sector having one of the driving electrodes provided thereon, and the vibrating body is fixed to the first surface of the piezoelectric element on which the driving electrodes are formed and has protrusions each disposed at selected sectors for transmitting driving power to the moving body.

12. An ultrasonic motor according to claim 1;

further comprising a first buffer disposed between the common connection point and a first group of the driving electrodes, and a parallel connection of the inverter and a second buffer connected between the common connection point and a second group of the driving electrodes.

13. An electronic device having a motor and an output mechanism driven by the motor;

wherein the ultrasonic motor comprises the ultrasonic motor according to claim 1; and the output mechanism is driven by the moving body.

14. An ultrasonic motor comprising:

a vibrating body having a piezoelectric element provided with a plurality of driving electrodes on one surface and a common electrode on another surface; a moving body in frictional contact with the vibrating body to undergo movement in response to vibration of the vibrating body; a self-excited oscillation circuit having an amplifier for amplifying an output signal of the piezoelectric element and feeding back the amplified output signal to the driving electrodes of the piezoelectric element, a filter circuit for filtering the amplified output signal, and an inverter for selectively inverting the amplified output signal and producing an inverted signal; wherein all of the driving electrodes of the piezoelectric element are simultaneously driven by either the amplified output signal or the inverted signal.

15. An ultrasonic motor according to claim 14; further comprising a spring member for resiliently urging the moving body into contact with the vibrating body.

16. An ultrasonic motor according to claim 14;

wherein the amplified output signal is supplied to all of the driving electrodes when the inverter is not selected so that a standing wave produced in the vibrating body causes the moving body to move in a first direction, and the amplified output signal is supplied to some of the driving electrodes while the inverted signal is supplied to other driving electrodes when the inverter is selected so that a standing wave produced in the vibrating body causes the moving body to move in a second direction opposite the first direction.

17. An ultrasonic motor according to claim 14;

wherein the self-excited oscillation circuit has a resonant circuit comprised of the piezoelectric element and a capacitor.

18. An ultrasonic motor according to claim 14;

wherein the surface of the piezoelectric element on which the driving electrodes are provided is divided into a plurality of sectors, each sector having one of the driving electrodes provided thereon and adjacent pairs of the sectors being oppositely polarized.

19. An ultrasonic motor according to claim 18;

wherein the vibrating body is fixed to the surface of the piezoelectric element on which the driving electrodes are formed and has protrusions each disposed at one of the sectors for transmitting a driving power to the moving body.

20. An ultrasonic motor according to claim 19;

wherein the piezoelectric element has a disc shape.

21. An ultrasonic motor according to claim 20;

wherein the common electrode covers substantially an entire surface of the piezoelectric element.

22. An ultrasonic motor according to claim 14;

wherein the self-excited oscillation circuit further comprises a first buffer disposed between an output of the amplifying circuit and a first group of the driving electrodes, and a parallel connection of the inverter and a second buffer connected between the output of the amplifying circuit and a second group of the driving electrodes.

23. An ultrasonic motor according to claim 14;

wherein the piezoelectric element becomes inductive between a resonance point and an anti-resonance point.

24. An ultrasonic motor according to claim 14;

wherein the signals supplied to the driving electrodes have a constant level whether or not the phase is inverted by the inverter.

\* \* \* \* \*